US008407908B2

(12) United States Patent
Noda

(10) Patent No.: US 8,407,908 B2
(45) Date of Patent: Apr. 2, 2013

(54) PROFILE MEASUREMENT APPARATUS

(75) Inventor: Takashi Noda, Utsunomiya (JP)

(73) Assignee: Mitutoyo Corporation, Kawasaki (JP)

( * ) Notice: Subject to any disclaimer, the term of this patent is extended or adjusted under 35 U.S.C. 154(b) by 52 days.

(21) Appl. No.: 13/168,242

(22) Filed: Jun. 24, 2011

(65) Prior Publication Data

US 2011/0314686 A1    Dec. 29, 2011

(30) Foreign Application Priority Data

Jun. 29, 2010    (JP) ................................. 2010-147406

(51) Int. Cl.
G01B 5/20    (2006.01)
(52) U.S. Cl. .......................................... 33/556; 33/551
(58) Field of Classification Search .................... 33/554, 33/555, 556, 558, 559, 561, 551, 503
See application file for complete search history.

(56) References Cited

U.S. PATENT DOCUMENTS

| 5,822,877 | A  | * | 10/1998 | Dai              | 33/560    |
|-----------|----|---|---------|------------------|-----------|
| 6,044,569 | A  | * | 4/2000  | Ogihara et al.   | 33/503    |
| 6,154,713 | A  | * | 11/2000 | Peter et al.     | 33/504    |
| 6,307,084 | B1 | * | 10/2001 | Matsuki et al.   | 33/561    |
| 6,449,581 | B1 | * | 9/2002  | Ruck             | 33/504    |
| 6,895,682 | B2 | * | 5/2005  | Sohn et al.      | 33/554    |
| 7,100,429 | B2 | * | 9/2006  | Matsuki et al.   | 33/556    |
| 7,318,285 | B2 | * | 1/2008  | Matsumiya et al. | 33/561    |
| 7,352,271 | B2 | * | 4/2008  | Nemoto et al.    | 33/505    |
| 7,376,261 | B2 | * | 5/2008  | Noda et al.      | 33/503    |
| 7,392,692 | B2 | * | 7/2008  | Noda             | 33/556    |
| 7,660,688 | B2 | * | 2/2010  | Ishikawa et al.  | 33/503    |
| 7,784,333 | B2 | * | 8/2010  | Nemoto et al.    | 33/556    |
| 8,006,402 | B2 | * | 8/2011  | Yoshizumi et al. | 33/556    |
| 8,140,178 | B2 | * | 3/2012  | Hon et al.       | 33/556    |
| 8,191,408 | B2 | * | 6/2012  | Igasaki et al.   | 33/556    |
| 2002/0123858 | A1 |   | 9/2002  | Ogura et al.     |           |
| 2005/0111725 | A1 | * | 5/2005  | Noda et al.      | 382/141   |
| 2005/0263727 | A1 | * | 12/2005 | Noda             | 250/559.29|
| 2007/0056176 | A1 | * | 3/2007  | Matsumiya et al. | 33/551    |
| 2007/0266582 | A1 | * | 11/2007 | Nemoto et al.    | 33/561    |
| 2009/0299692 | A1 | * | 12/2009 | Yoshizumi et al. | 33/556    |
| 2010/0101105 | A1 |   | 4/2010  | Hon et al.       |           |
| 2010/0119104 | A1 | * | 5/2010  | Mamour et al.    | 33/503    |
| 2011/0066400 | A1 | * | 3/2011  | Noda et al.      | 702/168   |
| 2011/0314686 | A1 | * | 12/2011 | Noda             | 33/556    |
| 2012/0204435 | A1 | * | 8/2012  | Nakajima         | 33/503    |

FOREIGN PATENT DOCUMENTS

JP    2009-288227    12/2009

* cited by examiner

Primary Examiner — Yaritza Guadalupe-McCall
(74) Attorney, Agent, or Firm — Rankin, Hill & Clark LLP

(57) ABSTRACT

A profile measurement apparatus includes: a probe which includes a gauge head for measuring a profile of an object to be measured and which moves the gauge head within a given range; a movement mechanism which moves the probe; and a controller which measures the profile by controlling the movement mechanism to contact the gauge head against the object. The controller comprises: a movement amount acquisition section which acquires a movement amount of the gauge head from a reference position; a deviation acquisition section which acquires as a deviation the movement amount when the gauge head is in a non-contact state; a determination section which determines whether the deviation is greater than a first threshold value; and a resetting section which, when the deviation is greater than the first threshold value, resets the reference position to a position arrived at by combining the reference position and the deviation.

4 Claims, 3 Drawing Sheets

PROFILE MEASUREMENT APPARATUS

This application claims priority from Japanese Patent Application No. 2010-147406, filed on Jun. 29, 2010, the entire content of which is hereby incorporated by reference.

FIELD OF THE INVENTION

Embodiments described herein relate to a profile measurement apparatus.

DESCRIPTION OF RELATED ART

A profile measurement apparatus is known for measuring a profile of an object to be measured by placing a gauge head in contact with the object. Such a profile measurement apparatus includes a probe including the gauge head for measuring the object to be measured and enabling the gauge head to move within a given range, a movement mechanism for moving the probe, and a controller for controlling the movement mechanism (see, for example, Patent Document 1). The three-dimensional measurement instrument (profile measurement apparatus) described in Patent Document 1 is provided with a probe, a movement mechanism and a control apparatus. In such a profile measurement apparatus, a position of the gauge head in which the gauge head is in a non-contact state is set as a reference position, and a movement amount of the gauge head from the reference position is acquired when the gauge head is placed in contact with the object to be measured. The object is then measured by moving the probe along a surface of the object with the probe in a state in which the probe is pressed against the object such that the gauge head exhibits the movement amount in a given range.

Patent Document 1: Patent Application Publication No. JP-A-2009-288227

However, occasions arise when the movement amount of the gauge head from the reference position no longer achieves zero even when the gauge head is in a non-contact state, due to the profile measurement apparatus being affected by changes in a temperature of the environment of use and due to changes to the profile measurement apparatus with a passage of time. In this case, measurement error arises in such cases since the profile measurement apparatus cannot achieve appropriate control of the position of the gauge head. The profile measurement apparatus may also misdiagnose the gauge head as being in contact with the object to be measured, despite the gauge head actually being in a non-contact state.

SUMMARY OF INVENTION

Illustrative aspects of the present invention provide a profile measurement apparatus that can appropriately control a position of a gauge head, and can appropriately determine whether or not the gauge head is in a non-contact state.

According to a first aspect of the invention, a profile measurement apparatus is provided with: a probe which includes a gauge head for measuring a profile of an object to be measured and which moves the gauge head within a given range; a movement mechanism which moves the probe; and a controller which measures the profile of the object to be measured by controlling the movement mechanism so as to contact the gauge head against the object to be measured. The controller comprises: a movement amount acquisition section which acquires a movement amount of the gauge head from a reference position; a deviation acquisition section which acquires as a deviation the movement amount when the gauge head is in a non-contact state; a determination section which determines whether or not the deviation is greater than a first threshold value; and a resetting section which, when the determination section determines that the deviation is greater than the first threshold value, resets the reference position to a position arrived at by combining the reference position and the deviation.

Other aspects and advantages of the invention will be apparent from the following description, the drawings and the claims.

BRIEF DESCRIPTION OF THE DRAWINGS

Exemplary embodiments of the present invention will be described in detail based on the following figures, wherein.

DETAILED DESCRIPTION OF EXEMPLARY EMBODIMENTS

Explanation follows regarding an exemplary embodiment, with reference to the drawings.

[Schematic Configuration of Three-Dimensional Measurement Instrument]

Figure 1:
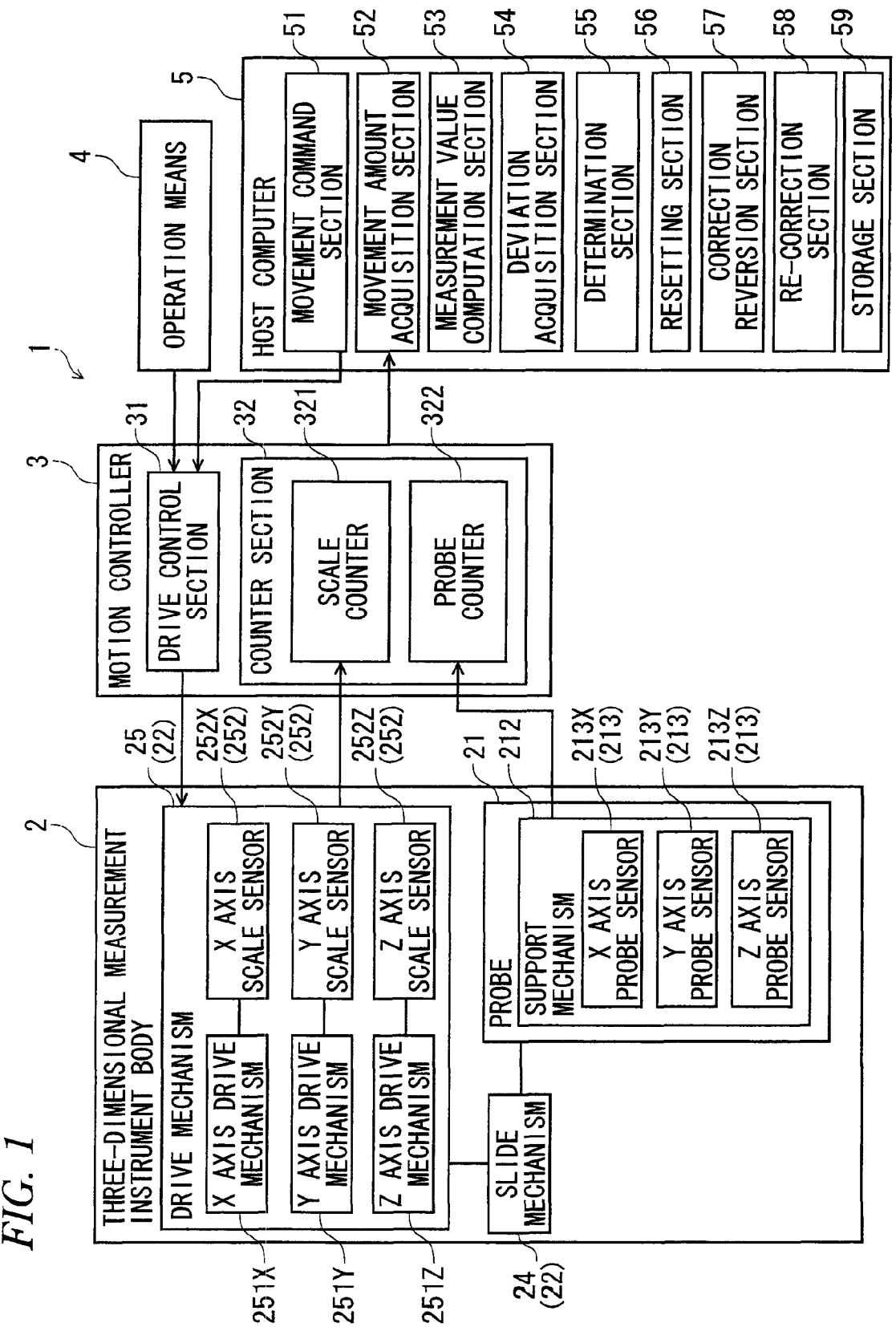
FIG. 1 is a block diagram showing a schematic configuration of a three-dimensional measurement instrument according to an exemplary embodiment.

FIG. 1 is a block diagram showing a schematic configuration of a three-dimensional measurement instrument 1 according to an exemplary embodiment. As shown in FIG. 1, the three-dimensional measurement instrument 1, serving as a profile measurement apparatus, includes: a three-dimensional measurement instrument body 2; a motion controller 3 for executing driving control of the three-dimensional measurement instrument body 2; operation means 4 for applying commands to the motion controller 3, such as through an operating lever, to manually operate the three-dimensional measurement instrument body 2; and a host computer 5 for applying specific commands to the motion controller 3 and for executing computation processing.

Figure 2:
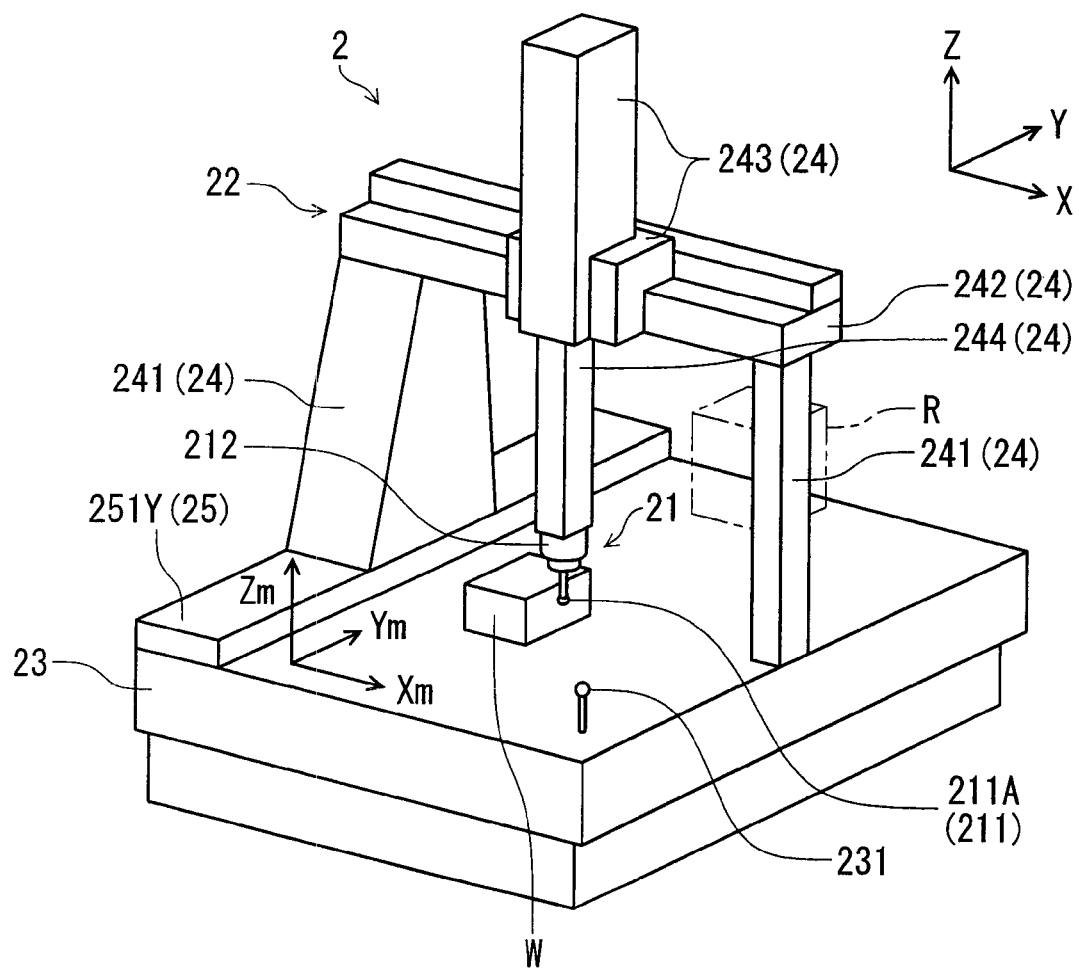
FIG. 2 is an overall schematic diagram showing a three-dimensional measurement instrument according to the exemplary embodiment.

FIG. 2 is an overall schematic diagram illustrating the three-dimensional measurement instrument body 2. In the following explanation of FIG. 2, the up direction is a +Z axis direction, and two axes perpendicular to the Z axis direction are an X axis and a Y axis, respectively. As shown in FIG. 2, the three-dimensional measurement instrument body 2 includes a probe 21 with a gauge head 211A for measuring an object to be measured W, a movement mechanism 22 for moving the probe 21, and a platen 23 on which the movement mechanism 22 stands. A reference sphere 231 of known radius is placed in the platen 23 for calibrating the three-dimensional measurement instrument body 2, and the reference sphere 231 can be placed in plural locations on the platen 23. The movement mechanism 22 includes a slide mechanism 24 for holding the probe 21 and enabling the probe 21 to be moved, and a drive mechanism 25 for driving the probe 21 by driving the slide mechanism 24.

The slide mechanism 24 includes: two columns 241 provided at the two edges of the platen 23 in the X axis direction so as to extend out in the +Z axis direction, with the columns 241 being capable of sliding along the Y axis direction; a beam 242 supported by the columns 241 and extending along the X axis direction; a slider 243 formed in a tube shape extending along the Z axis direction and provided so as to be capable of sliding on the beam 242 along the X axis direction; and a ram 244 inserted inside the slider 243 and provided so as to be capable of sliding along the Z axis direction within the slider 243.

The drive mechanism 25 is, as shown in FIG. 1 and FIG. 2, provided with: a Y axis drive mechanism 251Y for supporting the column 241 from the plural columns 241 on the −X axis direction side and driving this column 241 along the Y axis direction; an X axis drive mechanism 251X (not shown in FIG. 2) for sliding the slider 243 on the beam 242 and driving the slider 243 along the X axis direction; and a Z axis drive mechanism 251Z (not shown in FIG. 2) for sliding the ram 244 within the slider 243 and driving the ram 244 along the Z axis direction.

As shown in FIG. 1, the X axis drive mechanism 251X, the Y axis drive mechanism 251Y and the Z axis drive mechanism 251Z are respectively provided with an X axis scale sensor 252X, a Y axis scale sensor 252Y, and a Z axis scale sensor 252Z for detecting the axial direction positions of the slider 243, each of the columns 241 and the ram 244, respectively. Each of the scale sensors 252 is a position sensor that outputs a pulse signal according to a movement amount of the slider 243, each of the columns 241, and the ram 244.

The probe 21 includes a stylus 211 with the gauge head 211A at its leading end (−Z axis direction side), and a support mechanism 212 for supporting a base end (+Z axis direction side) of the stylus 211. By biasing the stylus 211 in each of the X, Y, Z axis directions, the support mechanism 212 supports and positions the stylus 211 at a specific position, while also enabling the stylus 211 to move within a set range in each axis direction of the X, Y, Z axis directions when the stylus 211 is imparted with an external force, for example when the gauge head 211A makes contact with the object to be measured W. Namely, the support mechanism 212 allows movement of the gauge head 211A within a set range. As shown in FIG. 1, the support mechanism 212 includes an X axis probe sensor 213X, a Y axis probe sensor 213Y and a Z axis probe sensor 213Z for detecting the position of the gauge head 211A in each respective axis direction. Each of the probe sensors 213 is a position sensor that outputs a pulse signal according to the movement amount of the gauge head 211A in each axis direction.

As shown in FIG. 1, the motion controller 3 includes a drive control section 31 for controlling drive mechanism 25 according to commands from the operation means 4 or the host computer 5, and a counter section 32 for counting pulse signals output from each of the scale sensors 252 and from each of the probe sensors 213. The counter section 32 includes a scale counter 321 for measuring the movement amount of the slide mechanism 24 by counting the pulse signal output from each of the scale sensors 252, and a probe counter 322 for measuring the movement amount of the gauge head 211A by counting the pulse signal output from each of the probe sensors 213. The movement amount of the slide mechanism 24 and the movement amount of the gauge head 211A computed by the scale counter 321 and the probe counter 322 are then output to the host computer 5.

The host computer 5, serving as a control apparatus, is configured to include a Central Processing Unit (CPU) and memory, etc., and controls the three-dimensional measurement instrument body 2 by giving specific commands to the motion controller 3. The host computer 5 includes a movement command section 51, a movement amount acquisition section 52, a measurement value computation section 53, a deviation acquisition section 54, a determination section 55, a resetting section 56, a correction reversion section 57, a re-correction section 58, and a storage section 59 for, for example, storing data and a reference position reset program, described later, employed by the host computer 5.

The movement command section 51 gives specific commands to the drive control section 31 of the motion controller 3, and drives the slide mechanism 24 of the three-dimensional measurement instrument body 2. More specifically, the movement command section 51 outputs positional command values for moving the probe 21 along the surface of the object to be measured W in a state in which the probe 21 is pressed against the object W, such that the movement amount of the gauge head 211A is constant. Contour data expressing a surface profile of the object W is stored in the storage section 59.

The movement amount acquisition section 52 acquires the movement amount (Xp, Yp, Zp) of the gauge head 211A and the movement amount (Xm, Ym, Zm) of the movement mechanism 22 computed by the counter section 32. The movement amount of the gauge head 211A acquired with the movement amount acquisition section 52 is the movement amount of the gauge head 211A from a reference position. The initial value of the reference position is, for example, stored in the storage section 59 by moving the probe 21 to a specific region R, as shown in FIG. 2, after power has been switched on to the three-dimensional measurement instrument 1, such that the gauge head 211A is placed in a non-contact state. The position of the specific region R is pre-stored in the storage section 59.

The measurement value computation section 53 combines the movement amount of the gauge head 211A and the movement amount of the movement mechanism 22, acquired by the movement amount acquisition section 52, and computes a measurement value by performing correction using a correction function, namely computes the position of the gauge head 211A. The correction function is determined by placing the gauge head 211A in contact with the reference sphere 231, measuring plural points on the surface of the reference sphere 231, and using a least square method to place each of these measured points onto the known surface of the reference sphere 231. The correction function is stored in the storage section 59. In the following explanation, setting the initial value for the reference position and determination of the correction function is referred to collectively as calibration.

The deviation acquisition section 54 periodically moves the probe 21 to the specific region R, namely to a non-contact position of the gauge head 211A. The deviation acquisition section 54 then acquires, as the deviation, the movement amount of the gauge head 211A from the initial value of the reference position where the gauge head 211A is in a non-contact state. The determination section 55 determines whether or not the deviation acquired by the deviation acquisition section 54 is greater than a first threshold value or a second threshold value. Each of these first and second threshold values is stored in the storage section 59.

When the determination section 55 determines that the deviation is greater than the first threshold value but not greater than the second threshold value, the resetting section 56 resets the reference position to the position arrived at by combining the current reference position and the deviation. The reset reference position post re-setting is stored in the storage section 59 separately to the initial value of the reference position. The initial value of the reference position set by executing calibration and any reference position(s) post re-setting are accordingly stored in the storage section 59.

When the reference position has been reset by the resetting section 56, the movement amount acquisition section 52 acquires the movement amount of the gauge head 211A from the initial value of the reference position and the movement amount of the gauge head 211A from the reference position post re-setting. The movement command section 51 then outputs a positional command value based on the movement amount of the gauge head 211A from the post re-setting reference position, and the measurement value computation section 53 computes a measurement value based on the movement amount of the gauge head 211A from the initial value of the reference position.

When the determination section 55 determines that the deviation is greater than the second threshold value, the resetting section 56 executes calibration. Namely, when the determination section 55 has determined that the deviation is greater than the second threshold value, the resetting section 56 resets both the initial value of the reference position and the correction function. When the correction function has been reset by the resetting section 56, the correction reversion section 57 employs an inverse function of the correction function prior to resetting to get the movement amount of the gauge head 211A, that has been corrected by the measurement value computation section 53 before executing the calibration, back to the state prior to correction. The re-correction section 58 combines the movement amount of the gauge head 211A, which is now back in the state prior to correction due to the correction reversion section 57, with the deviation acquired by the deviation acquisition section 54, and re-computes a measurement value by correcting using the correction function post resetting.

[Reference Position Resetting Processing]

Figure 3:
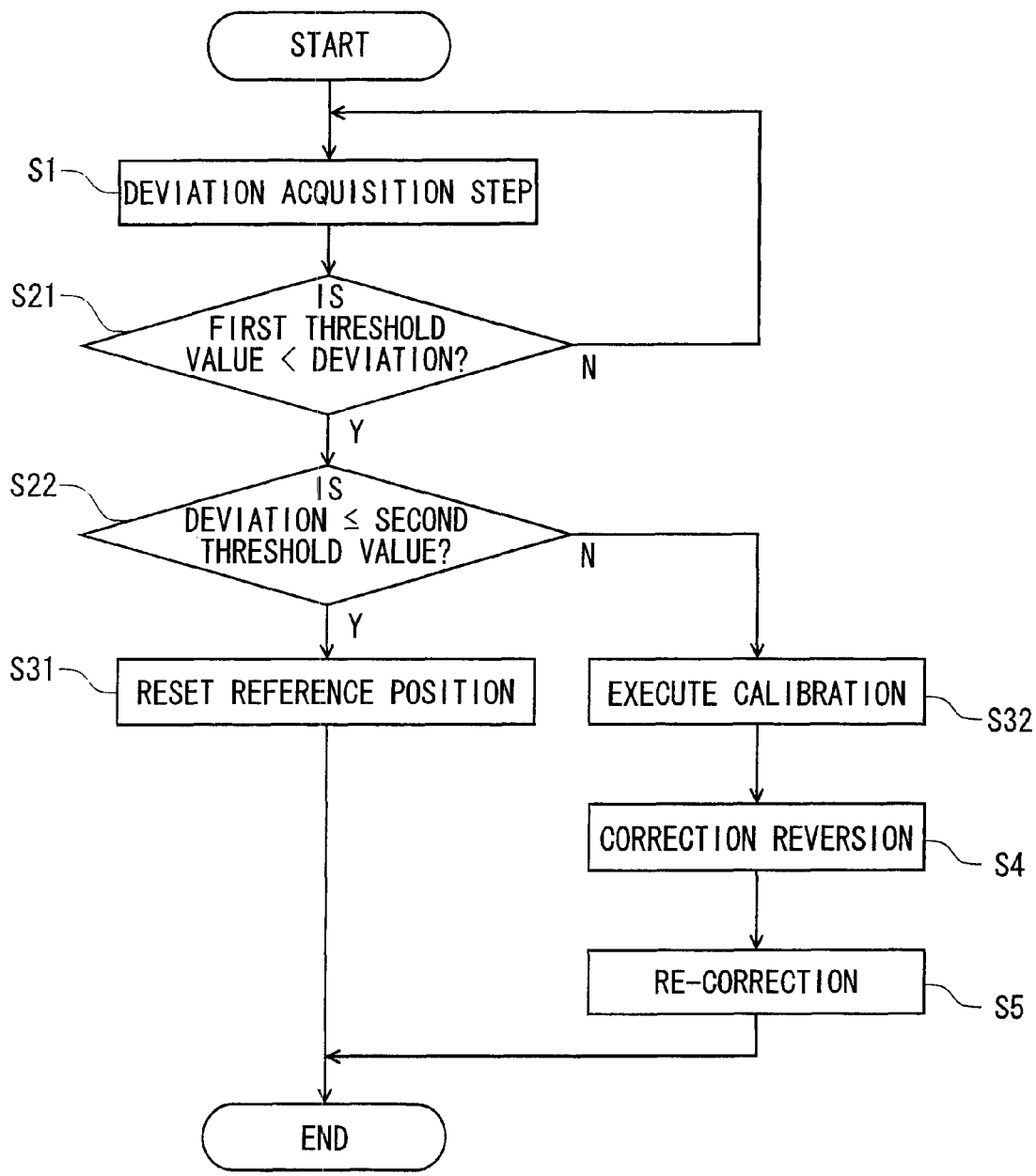
FIG. 3 is a flow chart showing resetting processing of a reference position according to the exemplary embodiment.

Explanation now follows regarding a resetting processing of the reference position. FIG. 3 shows a flow chart of the reference position resetting processing. The following steps S1 to S5 are executed when a reference position resetting program stored in the storage section 59 is executed.

Specifically, when the reference position resetting program is executed, the deviation acquisition section 54 acquires the deviation by periodically moving the probe 21 to the specific region R (deviation acquisition step S1). When the deviation has been acquired in deviation acquisition step S1, the determination section 55 determines whether or not the deviation is greater than the first threshold value (first determination step S21). When the deviation has been determined to be greater than the first threshold value in the first determination step S21, the determination section 55 determines whether or not the deviation is greater than the second threshold value (second determination step S22). When determination is made by the first determination step S21 that the deviation is the first threshold value or less, the host computer 5 re-executes the deviation acquisition step S1.

When the deviation is determined to not be greater than the second threshold value in the second determination step S22, the resetting section 56 resets the reference position to the position arrived at by combining the current reference position with the deviation (reference position resetting step S31). On the other hand, the deviation is determined to be greater than the second threshold value in the second determination step S22, the resetting section 56 executes calibration (calibration execution step S32).

When calibration is executed in the calibration execution step S32, the correction reversion section 57 employs an inverse function of the correction function prior to resetting on the movement amount of the gauge head 211A, which was corrected by the measurement value computation section 53 prior to executing calibration, to get back to the state prior to correction (correction reversion step S4). When the movement amount of the gauge head 211A has been reverted by the correction reversion step S4 to the state prior to correction, the re-correction section 58 then combines the movement amount of the gauge head 211A in the state prior to correction with the deviation acquired by the deviation acquisition section 54, and re-computes the measurement value by performing correction employing the correction function post re-setting (re-correction step S5). The host computer 5 executes the reference position resetting processing by completing the execution of steps S1 to S5.

The present exemplary embodiment has the following effects.

(1) Due to provision of the deviation acquisition section 54, the three-dimensional measurement instrument 1 can acquire as the deviation the movement amount of the gauge head 211A from the reference position, which is a non-contact state of the gauge head 211A. When by the determination section 55 determines that the deviation is greater than the first threshold value but not greater than the second threshold value, the resetting section 56 re-sets the reference position to the position resulting from combination of the current reference position and the deviation. Consequently, the movement amount of the gauge head 211A from the reference position acquired by the movement amount acquisition section 52 post re-setting becomes zero. The position of the gauge head 211A can accordingly be appropriately controlled, and whether or not the gauge head 211A is in a non-contact state can be appropriated determined.

(2) Due to the deviation acquisition section 54 moving the probe 21 and acquiring the deviation, the host computer 5 can ensure that the movement amount of the gauge head 211A is zero in non-contact states of the gauge head 211A.

(3) Due to the movement command section 51 outputting a positional command value based on the movement amount of the gauge head 211A from the reference position post re-setting, and due to the measurement value computation section 53 computing the measurement value based on the movement amount of the gauge head 211A from the initial value of the reference position, the position of the gauge head 211A can be appropriately controlled even after resetting the reference position, and appropriate measurement values can be computed.

(4) The resetting section 56 executes a calibration when the determination section 55 has determined that the deviation is greater than the second threshold value. Consequently, the initial value of the reference position and the correction function can both be reset when the three-dimensional measurement instrument 1 has been significantly affected by temperature changes in usage environment or changes occurring in the three-dimensional measurement instrument 1 due to the passage of time.

(5) Due to provision of the correction reversion section 57 and the re-correction section 58 in the host computer 5, appropriate measurement values can be re-computed without re-measuring the movement amounts of the gauge head 211A from the initial value of the reference position post re-setting.

Modified Exemplary Embodiments

The invention is not limited to the exemplary embodiment described, and the invention includes various modifications and improvement within a range capable of achieving the object of the invention. For example, in the exemplary embodiment described, the deviation acquisition section 54 acquires the deviation by periodically moving the probe 21 to the specific region R, however the deviation may be acquired by movement to a region other than the specific region R. Configuration may also be made such that the deviation acquisition section 54 acquires the deviation at a given timing, for example acquiring the deviation after performing rotation of the probe or after exchanging probes. In the exemplary embodiment described above, the deviation acquisition section 54 acquires the deviation of the movement amount of the gauge head 211A from the initial value of the reference position in which the gauge head 211A is in a non-contact state, however configuration may be made such that the movement amount of the gauge head from the reference position post re-setting is acquired as the deviation. In other words, as the deviation, the deviation acquisition section may acquire the movement amount of the gauge head from any reference position in which the gauge head is in a non-contact state.

In the exemplary embodiment described above, the measurement value computation section 53 computes the measurement value based on the movement amount of the gauge head 211A from the initial value of the reference position, however configuration may be made such that the measurement value is computed based on the movement amount of the gauge head from the reference position post re-setting. In the exemplary embodiment described above, when the deviation is determined to be greater than the second threshold value by the determination section 55, the resetting section 56 executes a calibration, however configuration may be made with or without a calibration execution function. In the exemplary embodiment described above, the host computer 5 includes both the correction reversion section 57 and the re-correction section 58, however configuration may be made without these functions.

In the exemplary embodiment described above, the three-dimensional measurement instrument 1 is illustrated as an example of a profile measurement apparatus, however the invention may be applied to another profile measurement apparatus. In other words, application may be made to any profile measurement apparatus for measuring the profile of an object to be measured by placing a gauge head in contact with the object to be measured, with the profile measurement apparatus including the gauge head for measuring the object to be measured, a probe enabling the gauge head to be moved within a given range, a movement mechanism for moving the probe, and a controller for controlling the movement mechanism.

What is claimed is:

1. A profile measurement apparatus comprising:
    a probe which includes a gauge head for measuring a profile of an object to be measured and which moves the gauge head within a given range;
    a movement mechanism which moves the probe; and
    a controller which measures the profile of the object to be measured by controlling the movement mechanism so as to contact the gauge head against the object to be measured,
    wherein the controller comprises:
    a movement amount acquisition section which acquires a movement amount of the gauge head from a reference position;
    a deviation acquisition section which acquires as a deviation the movement amount when the gauge head is in a non-contact state;
    a determination section which determines whether or not the deviation is greater than a first threshold value; and
    a resetting section which, when the determination section determines that the deviation is greater than the first threshold value, resets the reference position to a position arrived at by combining the reference position and the deviation;
    wherein the deviation acquisition section acquires the deviation by moving the probe to a position in which the gauge head is in a non-contact state.

2. The profile measurement apparatus of claim 1,
    wherein the controller further comprises:
    a movement command section which outputs a positional command value for moving the probe; and
    a measurement value computation section for computing a measurement value by correcting the movement amount using a correction function,
    wherein the movement amount acquisition section, when the reference position has been reset by the resetting section, acquires the movement amount of the gauge head from the initial value of the reference position and the movement amount of the gauge head from the reset reference position, and
    wherein the movement command section outputs the positional command value based on the movement amount of the gauge head from the reset reference position, and the measurement value computation section computes the measurement value based on the movement amount of the gauge head from the initial value of the reference position.

3. The profile measurement apparatus of claim 2,
    wherein the deviation acquisition section acquires as the deviation the movement amount of the gauge head from the initial value of the reference position,
    wherein the determination section determines whether or not the deviation acquired by the deviation acquisition section is greater than a second threshold value, and
    wherein the resetting section resets the initial value of the reference position and the correction function when the determination section determines that the deviation is greater than the second threshold value.

4. The profile measurement apparatus of claim 3, wherein the controller further comprises:
    a correction reversion section which, when the correction function has been reset by the resetting section, reverts the movement amount of the gauge head that has been corrected by the measurement value computation section prior to resetting to a state prior to correction by applying an inverse function of the correction function prior to resetting; and
    a re-correction section which combines the movement amount of the gauge head reverted to the state prior to resetting by the correction reversion section and the deviation, and re-computes the measurement value by correcting using the correction function post re-setting.

* * * * *